US008552862B2

(12) United States Patent
Chen et al.

(10) Patent No.: US 8,552,862 B2
(45) Date of Patent: Oct. 8, 2013

(54) SYSTEM AND METHOD FOR DETECTING MULTI-LEVEL INTRUSION EVENTS AND COMPUTER PROGRAM PRODUCT THEREOF

(75) Inventors: Jian-Ren Chen, Hsinchu County (TW); Leii H. Chang, Hsinchu County (TW); Ho-Hsin Lee, Hsinchu (TW); Yi-Fei Luo, Hsinchu County (TW); Chii-Yah Yuan, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 583 days.

(21) Appl. No.: 12/839,425

(22) Filed: Jul. 20, 2010

(65) Prior Publication Data
US 2011/0140892 A1    Jun. 16, 2011

(30) Foreign Application Priority Data
Dec. 16, 2009    (TW) ............................... 98143226 A

(51) Int. Cl.
*G08B 13/00*    (2006.01)
(52) U.S. Cl.
USPC ... 340/541; 340/540; 340/539.13; 340/686.6; 340/5.2; 348/152
(58) Field of Classification Search
USPC .................... 340/541, 539.1, 540, 686.6, 5.2, 340/5.82, 506, 522, 524, 286.14; 348/152, 348/159, E07.085; 382/224
See application file for complete search history.

(56) References Cited

U.S. PATENT DOCUMENTS

| | | | |
|---|---|---|---|
| 5,440,498 | A | 8/1995 | Timm |
| 6,696,945 | B1 | 2/2004 | Venetianer et al. |
| 6,970,083 | B2 | 11/2005 | Venetianer et al. |
| 7,233,243 | B2 | 6/2007 | Roche et al. |

(Continued)

FOREIGN PATENT DOCUMENTS

| | | |
|---|---|---|
| TW | 524366 | 3/2003 |
| TW | I270019 | 1/2007 |

(Continued)

OTHER PUBLICATIONS

Abbasi et al., "A Multi-Layer Intruder Detection System for Multi-Hop Cluster-Based Sensor Networks," Proceedings of the 2006 International Conference on Wireless Networks, Jun. 2006, pp. 1-7.

(Continued)

*Primary Examiner* — Hoi Lau
(74) *Attorney, Agent, or Firm* — Jianq Chyun IP Office

(57) ABSTRACT

A system and a method for detecting multi-level intrusion events are provided. The system includes an area recognition module and an area classification module. The area recognition module performs a geometric topology operation to recognize a plurality of areas in a ground plane that has a plurality of boundaries and a plurality of gates, and each of the areas is constituted of at least one of the boundaries and at least one of the gates. The area classification module defines a plurality of security levels and classifies each of the areas recognized by the area recognition module as one of the security levels. Accordingly, the system is able to automatically recognize the areas in the ground plane, set the security levels of the areas, and generate the corresponding detection areas and tripwires according to the security levels of the areas.

36 Claims, 13 Drawing Sheets

(56) References Cited

U.S. PATENT DOCUMENTS

| | | | |
|---|---|---|---|
| 7,503,067 B2 | 3/2009 | Yeung et al. | |
| 7,530,110 B2 | 5/2009 | Cheng et al. | |
| 7,579,945 B1* | 8/2009 | Richter et al. | ................ 340/506 |
| 2003/0231788 A1 | 12/2003 | Yukhin et al. | |
| 2007/0047837 A1 | 3/2007 | Schwab et al. | |
| 2007/0188318 A1* | 8/2007 | Cole et al. | ............... 340/539.13 |
| 2007/0229662 A1 | 10/2007 | Aoki et al. | |
| 2008/0162556 A1 | 7/2008 | McConnell | |
| 2008/0198231 A1* | 8/2008 | Ozdemir et al. | ............. 348/159 |
| 2009/0303040 A1* | 12/2009 | Srinivasa et al. | ............. 340/540 |
| 2010/0085152 A1* | 4/2010 | Fukuda et al. | ............... 340/5.82 |
| 2010/0134310 A1* | 6/2010 | Zheng et al. | ............... 340/686.6 |

FOREIGN PATENT DOCUMENTS

| | | |
|---|---|---|
| TW | I287762 | 10/2007 |
| TW | I287763 | 10/2007 |
| TW | I312491 | 7/2009 |

OTHER PUBLICATIONS

"Office Action of Taiwan Counterpart Application", issued on Feb. 4, 2013, p. 1-p. 5.

\* cited by examiner

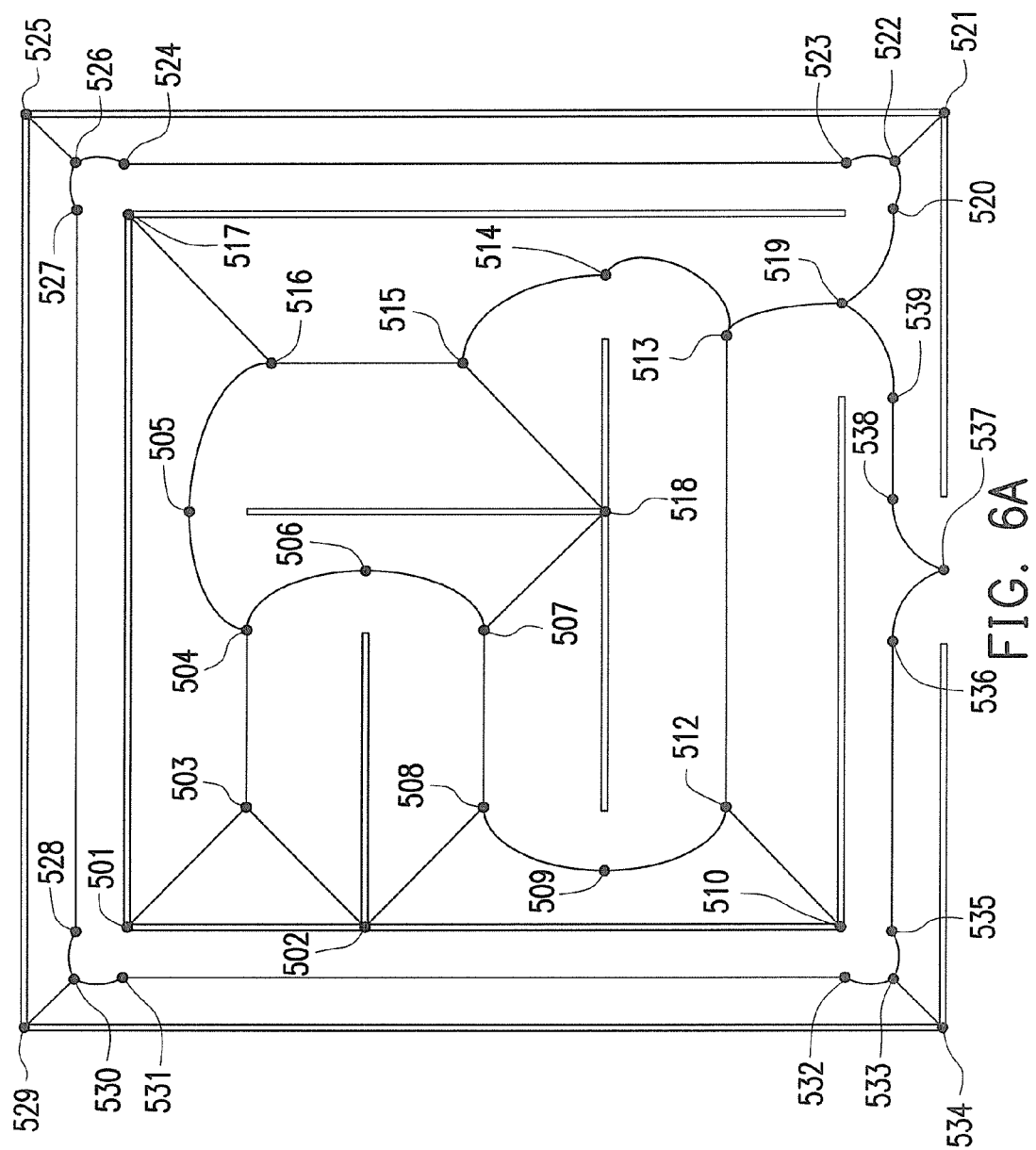

|  | Detection coverage rate | Effective detection rate |
|---|---|---|
| Area A | 0% | 0% |
| Area B | 10% | 40% |
| Area C | 60% | 50% |
| Area D | 50% | 50% |
| Tripwire 801 | 0% | 0% |
| Tripwire 802 | 50% | 30% |
| Tripwire 803 | 100% | 90% |
| Tripwire 804 | 0% | 0% |

FIG. 7B

SYSTEM AND METHOD FOR DETECTING MULTI-LEVEL INTRUSION EVENTS AND COMPUTER PROGRAM PRODUCT THEREOF

CROSS-REFERENCE TO RELATED APPLICATION

This application claims the priority benefit of Taiwan application serial no. 98143226, filed on Dec. 16, 2009. The entirety of the above-mentioned patent application is hereby incorporated by reference herein and made a part of specification.

BACKGROUND OF THE INVENTION

1. Field

The present disclosure relates to a system and a method for detecting multi-level intrusion events.

2. Description of Related Art

Intrusion detection is currently the most focused intelligent visual recognition technique. Along with the advancement of computer computing power and the development of video processing techniques, video-based event detection has become one of the major functions of today's surveillance systems. Intrusion detection is the most mature technique among all existing event detection techniques, and all intelligent video cameras and video servers offer such a function. "Intrusion" means a moving object moves from an unprotected side to a protected side. Thereby, restricted areas with distinguishable inside and outside or tripwires between unprotected areas and protected areas need to be predefined, and whether a moving object intrudes a system or a region of a user's interest is determined according to aforementioned definitions.

Presently, all the settings of intrusion detection have to be done manually, and the system usually provides a user interface such that a user can draw lines on a video or an image for indicating areas or tripwires. This technique works well in a surveillance system having only a few video cameras. However, it will be too labour-consuming to do all the settings in a large system with hundreds of video cameras. Besides, the settings are done in each video camera individually. Without a systematic methodology of setting and verification, it is almost impossible to ensure that every video camera is correctly set up. It is also difficult for a user to verify if these settings meet the requirements.

Thereby, the development of a multi-level intrusion event detecting system that can automatically analyze the positions of areas and gates in a building, set the security levels of the areas, and generate the corresponding detection areas and tripwires according to the security levels of the areas has become one of the major subjects in the industry.

SUMMARY

Accordingly, the present disclosure is directed to a system and a method for detecting multi-level intrusion events, wherein areas in a ground plane are automatically recognized, security levels of the areas are automatically set, and the corresponding detection areas and tripwires are automatically generated according to the security levels of the areas.

According to an exemplary embodiment of the present disclosure, a multi-level intrusion event detecting system including an area recognition module and an area classification module is provided. The area recognition module performs a geometric topology operation to recognize a plurality of areas in a ground plane, wherein the ground plane has a plurality of boundaries and a plurality of gates, and each of the areas is corresponding to at least one of the boundaries and at least one of the gates. The area classification module defines a plurality of security levels and respectively classifies the areas recognized by the area recognition module as the security levels.

According to an exemplary embodiment of the present disclosure, a multi-level intrusion event detecting method is provided. The multi-level intrusion event detecting method includes performing a geometric topology operation to recognize a plurality of areas in a ground plane, wherein the ground plane has a plurality of boundaries and a plurality of gates, and each of the areas is corresponding to at least one of the boundaries and at least one of the gates. The multi-level intrusion event detecting method also includes defining a plurality of security levels and respectively classifying the areas as the security levels.

According to an exemplary embodiment of the present disclosure, a computer program product is provided. The computer program product includes a plurality of program instructions, and the program instructions are suitable for being loaded into a computer system to execute the aforementioned multi-level intrusion event detecting method.

According to an exemplary embodiment of the present disclosure, a computer-readable recording medium for recording a program is provided, wherein the program executes the aforementioned multi-level intrusion event detecting method when the program is loaded into a computer system and executed by the same.

As described above, in exemplary embodiments of the present disclosure, the positions of areas and gates in a building can be automatically analyzed and the security levels of the areas can be automatically set.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 6A is a ground plane and a skeleton thereof according to another exemplary embodiment of the present disclosure.

FIG. 7A and FIG. 7B are diagrams illustrating an example of detection coverage rates and effective detection rates of areas and gates according to an exemplary embodiment of the present disclosure.

DESCRIPTION OF THE EMBODIMENTS

Figure 1:
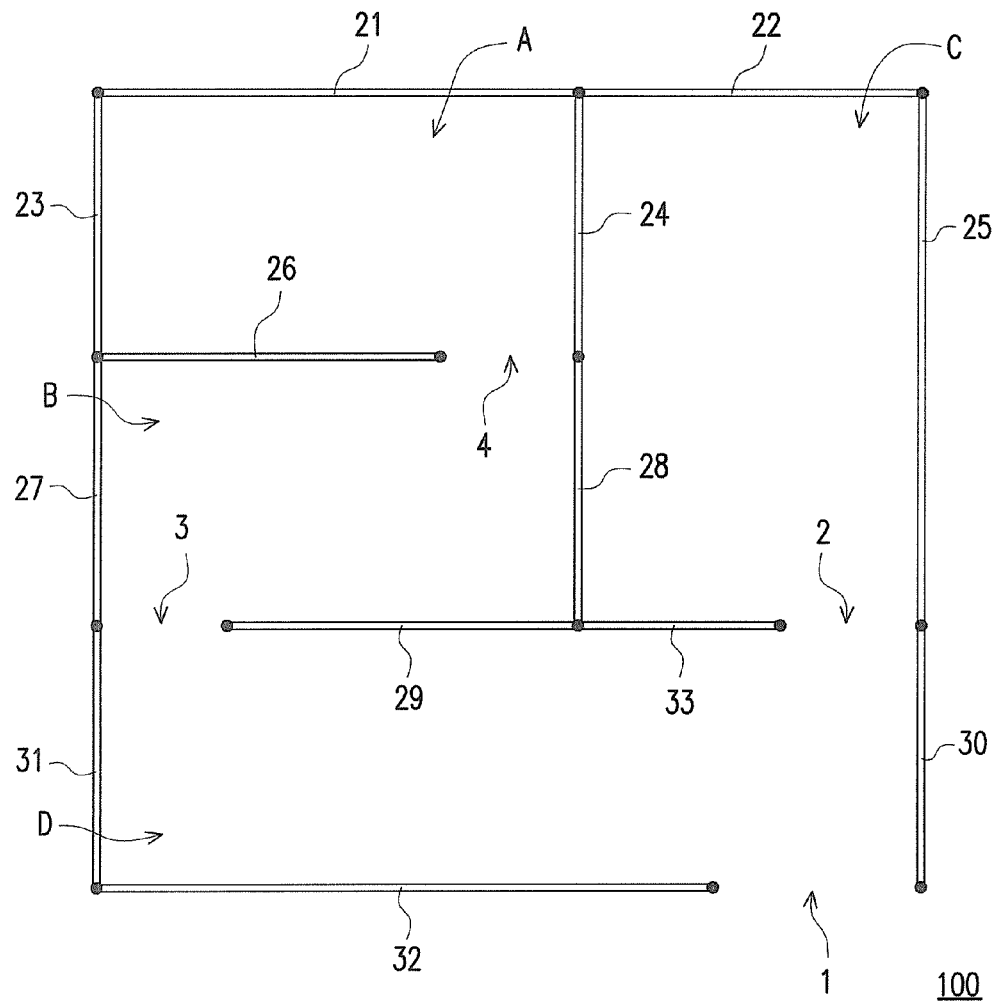
FIG. 1 is a ground plane of a building according to an exemplary embodiment of the present disclosure.

Reference will now be made in detail to the present preferred embodiments of the disclosure, examples of which are illustrated in the accompanying drawings. Wherever possible, the same reference numbers are used in the drawings and the description to refer to the same or like parts.

FIG. 1 is a ground plane of a building according to an exemplary embodiment of the present disclosure.

Referring to FIG. 1, the ground plane 100 of the building is composed of boundaries 21-33 and gates 1-4. Herein the boundaries are also referred to as walls. In this example, the boundaries 21, 23, 24, and 26, and the gate 4 form an area A, the boundaries 26, 27, 28, and 29 and the gates 3 and 4 form an area B, the boundaries 22, 24, 25, 28, and 33 and the gate 2 form an area C, and the boundaries 29, 30, 31, 32, and 33 and the gate 3, 2, and 1 form an area D, wherein the gate 1 is a building gate (i.e., the first gate for entering the area A, the area B, the area C, and the area D). It should be noted that the ground plan 100 may refer to a floor plan of a building. Examples of the ground plan 100 may be a building sketch, a building schematic diagram, an architectural presentation drawing, a blue print, a computer aided drawing, or an architectural engineering design drawing.

Figure 2:
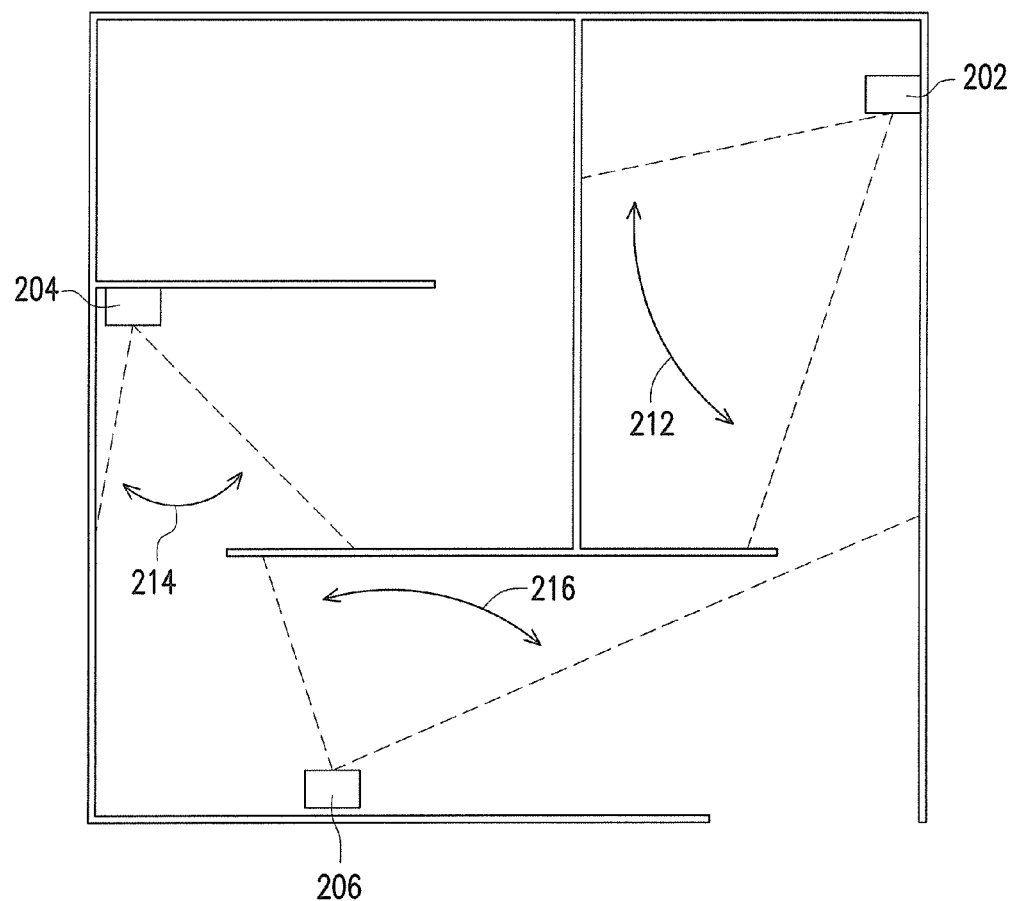
FIG. 2 a diagram illustrating intrusion detection performed in the building illustrated in FIG. 1 according to an exemplary embodiment of the present disclosure.

FIG. 2 is a diagram illustrating intrusion detection performed in the building illustrated in FIG. 1 according to an exemplary embodiment of the present disclosure.

Referring to FIG. 2, a sensor device 202, a sensor device 204, and a sensor device 206 are respectively deployed in the building. In the present exemplary embodiment, the sensor device 202, the sensor device 204, and the sensor device 206 are video cameras. However, the present disclosure is not limited thereto, and in another exemplary embodiment of the present disclosure, the sensor device 202, the sensor device 204, and the sensor device 206 may also be infrared detectors, thermal imaging devices, or radar scanners.

In the present exemplary embodiment, the field of view (FOV) of an image generated by the sensor device 202 is corresponding to a detection range 212, the FOV of an image generated by the sensor device 204 is corresponding to a detection range 214, and the FOV of an image generated by the sensor device 206 is corresponding to a detection range 216. Namely, the sensor device 202, the sensor device 204, and the sensor device 206 can detect the detection ranges 212, 214, and 216 in the ground plane 100 of the building.

Figure 3:
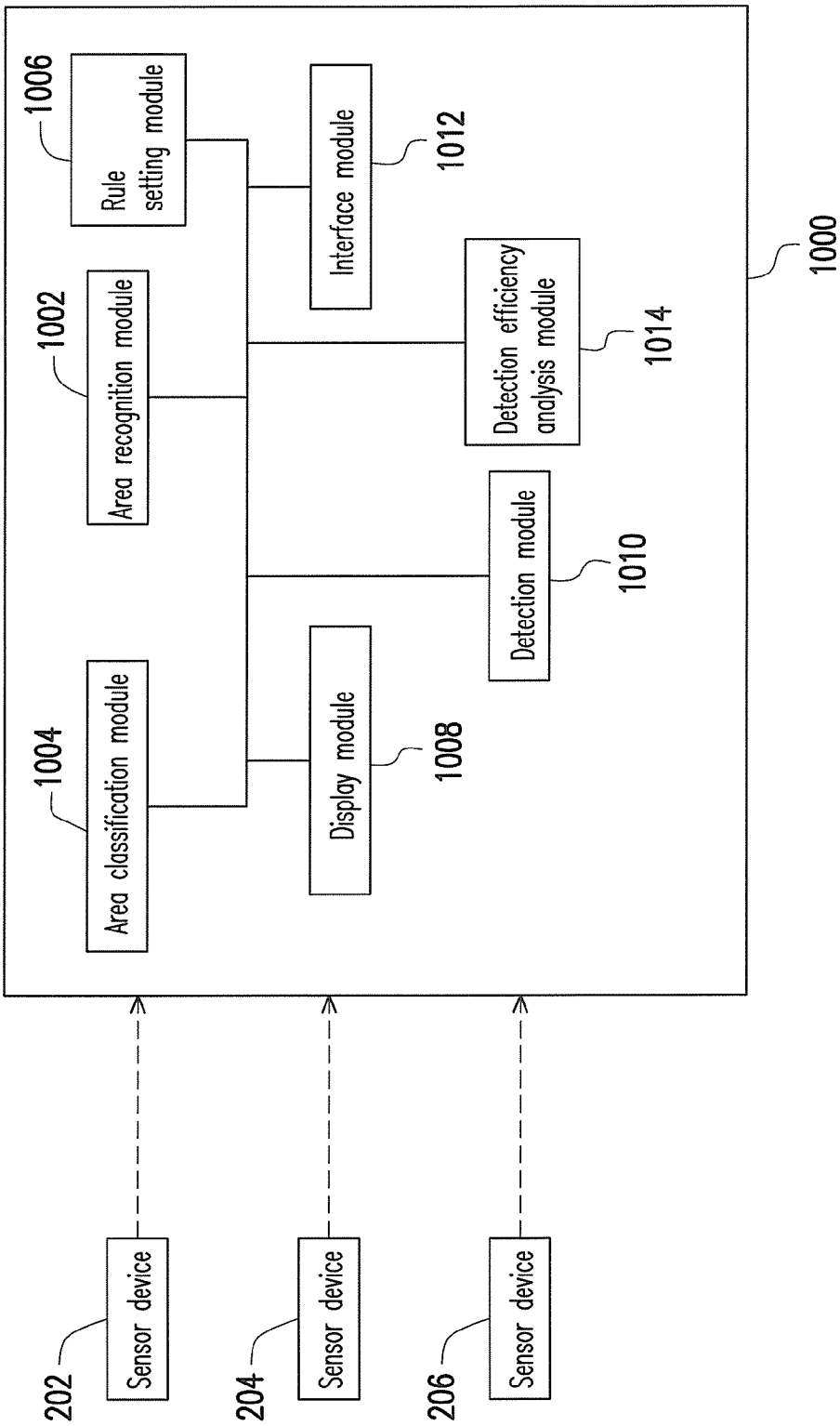
FIG. 3 is a schematic block diagram of a multi-level intrusion event detecting system according to an exemplary embodiment of the present disclosure.

FIG. 3 is a schematic block diagram of a multi-level intrusion event detecting system according to an exemplary embodiment of the present disclosure.

The multi-level intrusion event detecting system 1000 includes an area recognition module 1002 and an area classification module 1004.

Figure 4A:
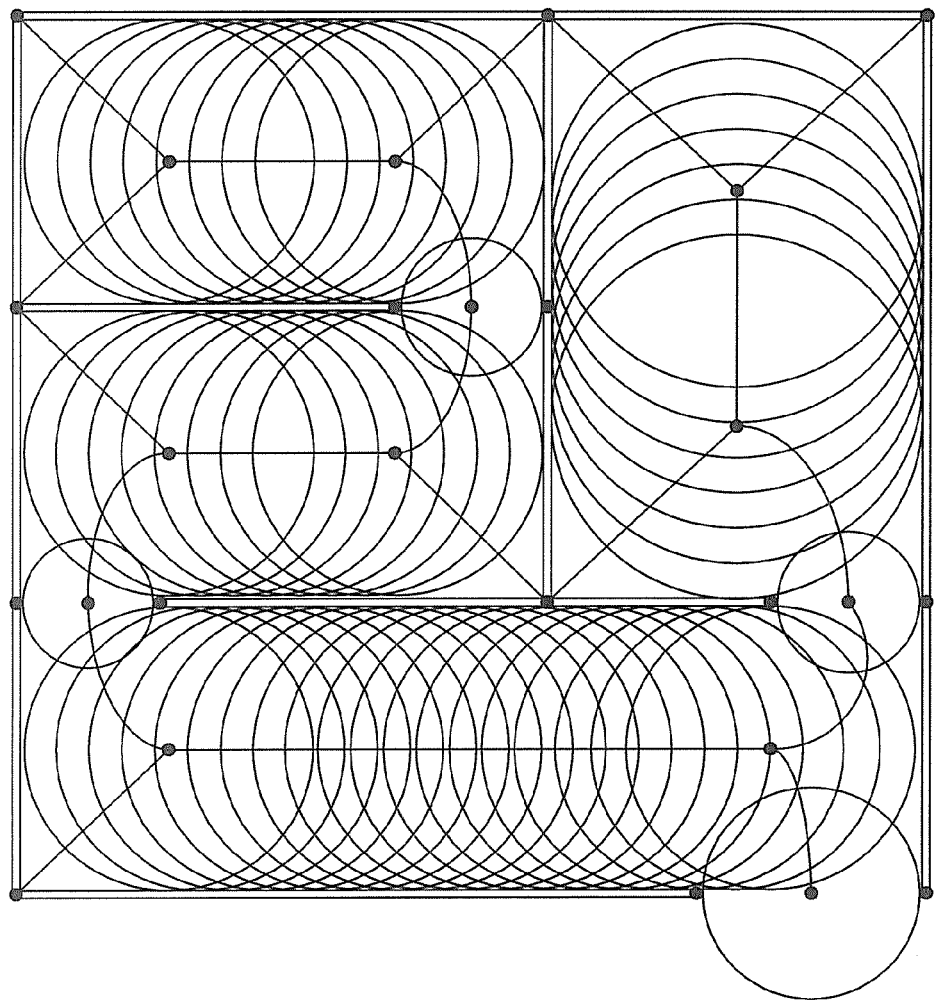
FIG. 4A and FIG. 4B are diagrams illustrating how medial axis transformation is performed to a ground plane according to an exemplary embodiment of the present disclosure.

The area recognition module 1002 performs a geometric topology operation to identify areas (i.e., the areas A, B, C, and D) in the ground plane 100. In the present exemplary embodiment, the geometric topology operation is a medial axis transformation. To be specific, the area recognition module 1002 performs the medial axis transformation on the ground plane 100 to generate a skeleton composed of a plurality of skeleton points, wherein the skeleton is constituted by the centers of the maximum inscribed circles in the ground plane (as shown in FIG. 4A). In addition, the area recognition module 1002 recognizes the areas in the ground plane 100 according to the radiuses of the maximum inscribed circles corresponding to the skeleton points.

Figure 4B:
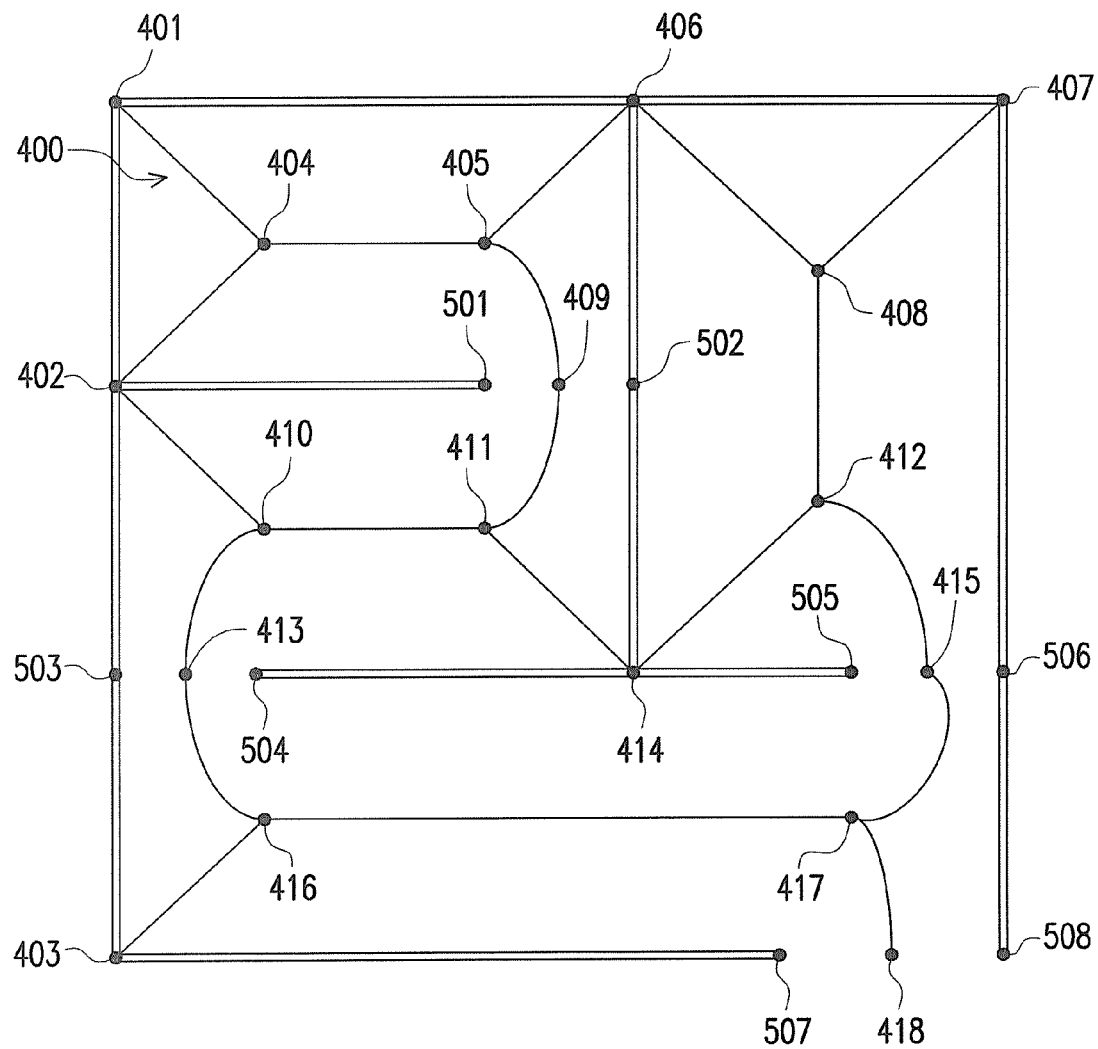

FIG. 4A and FIG. 4B are diagrams illustrating how medial axis transformation is performed to a ground plane according to an exemplary embodiment of the present disclosure.

Referring to FIG. 4A and FIG. 4B, the area recognition module 1002 performs a medial axis transformation on the ground plane 100 to generate the maximum inscribed circles formed by the boundaries in the ground plane 100, and connects the centers of the maximum inscribed circles to generate a skeleton 400, wherein the skeleton 400 includes a plurality of skeleton points (for example, the skeleton points 401-418). As described above, the skeleton 400 is formed by the centers of the maximum inscribed circles in the ground plane 100. Accordingly, each skeleton point has a radius corresponding to a maximum inscribed circle.

In the present exemplary embodiment, the area recognition module 1002 recognizes the meaning of each skeleton point according to the radius of the skeleton point. To be specific, take a skeleton point for example, if the radius of the skeleton point is smaller than those of the adjacent skeleton points (i.e., the radius of the skeleton point is a local minimum), the position of the skeleton point is determined to be a wall corner or a gate, wherein if the radius of the skeleton point is 0, the position of the skeleton point is determined to be a wall corner, and if the radius of the skeleton point is not 0, the position of the skeleton point is determined to be a gate. In addition, if the radius of the skeleton point is greater than or equal to those of the adjacent skeleton points (i.e., the radius of the skeleton point is a local maximum), the position of the skeleton point is determined to be a primary space (i.e., an area).

Accordingly, in the present exemplary embodiment, the area recognition module 1002 searches for those skeleton points whose radiuses are local minimums, and determines whether the radius of each skeleton point is greater than 0, so as to recognize whether the position of the skeleton point is a wall corner or a gate. In the exemplary embodiment illustrated in FIG. 4B, the area recognition module 1002 recognizes the skeleton points 401, 402, 403, 406, 407, and 414 as wall corner points and the skeleton points 409, 413, 415, and 418 as gate points. In particular, the area recognition module 1002 recognizes the connecting line, which is formed by connecting the tangent points between the maximum inscribed circle of the corresponding gate point and the boundaries, as a gate. For example, the area recognition module 1002 recognizes the connecting line, which is formed by connecting the tangent points 501 and 502 between the maximum inscribed circle of the corresponding skeleton point 409 and the boundaries, as a gate (i.e., the gate 4), the connecting line, which is formed by connecting the tangent points 503 and 504 between the maximum inscribed circle of the corresponding skeleton point 413 and the boundaries, as a gate (i.e., the gate 3), the connecting line which is formed by connecting the tangent points 505 and 506 between the maximum inscribed circle of the corresponding skeleton point 415 and the boundaries, as a gate (i.e., the gate 2), and the connecting line which is formed by connecting the tangent points 507 and 508 between the maximum inscribed circle of the corresponding skeleton point 418 and the boundaries, as a gate (i.e., the gate 1). In particular, the area recognition module 1002 identifies a gate point having only one end adjacent to other skeleton points among all the gate points and recognizes the gate point as a building gate point. For example, the area recognition module 1002 recognizes the gate point 418 as a building gate point, and the gate corresponding to the gate point 418 as a building gate. Herein a building gate is referred to the entrance for entering a building.

Additionally, the area recognition module 1002 is able to search for the skeleton points whose radiuses are local maximums among all the skeleton points, and recognize the positions of these skeleton points as the areas. Herein if there are two skeleton points on the skeleton having their radiuses as local maximums and the two skeleton points are adjacent to each other, the positions of the two skeleton points are recognized as belonging to the same area. In the exemplary embodiment illustrated in FIG. 4B, the area recognition module 1002 recognizes the positions of the skeleton points 404 and 405 as belonging to the same area (i.e., the area A), the positions of the skeleton points 410 and 411 as belonging to the same area (i.e., the area B), the positions of the skeleton points 408 and 412 as belonging to the same area (i.e., the area C), and the positions of the skeleton points 416 and 417 as belonging to the same area (i.e., the area D).

Referring to FIG. 3 again, the area classification module 1004 defines a plurality of security levels. Moreover, the areas A, B, C, and D recognized by the area recognition module 1002 are set to be one of the security levels respectively.

For example, in an exemplary embodiment of the present disclosure, the area classification module 1004 transforms the skeleton generated by the area recognition module 1002 into a tree structure with the skeleton point having the greatest radius within the local area as the root. And, the area classification module 1004 finds a path from the root to the building gate point with the least number of gate points according to the tree structure, so as to figure out the security level of the area corresponding to the root based on the number of gate points.

Figure 5:
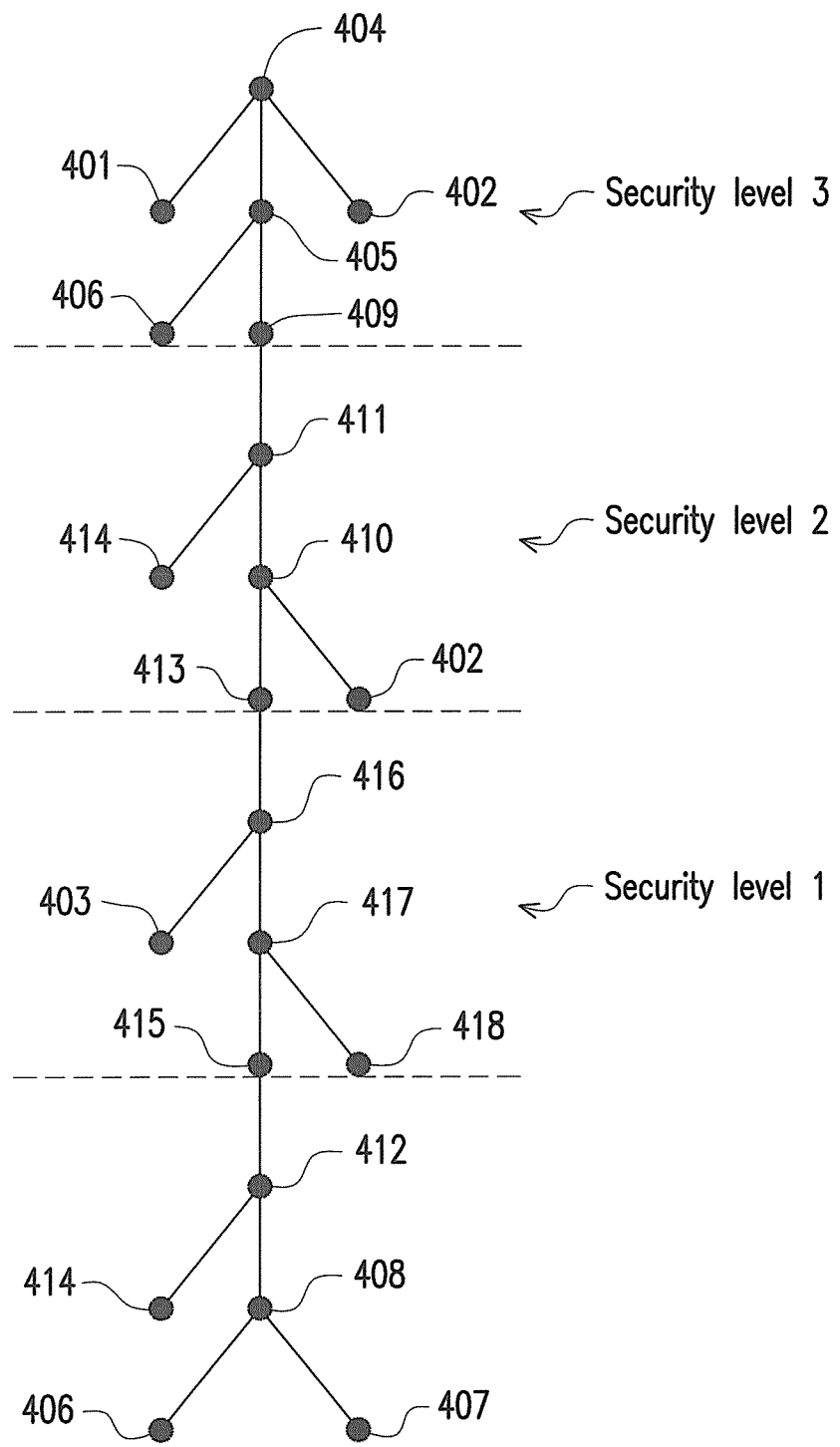
FIG. 5 is a diagram illustrating an example of tree structure classification according to an exemplary embodiment of the present disclosure.

FIG. 5 is a diagram illustrating an example of tree structure classification according to an exemplary embodiment of the present disclosure.

Referring to FIG. 5, in the present example, the area classification module 1004 transforms the skeleton 400 into a tree structure with the skeleton point 404 as the root, and determines that at least two additional gate points (i.e., the gate points 409 and 413) have to be passed through from the skeleton point 404 to the building gate point 418 according to the tree structure. Accordingly, in the present example, the area A corresponding to the skeleton point 404 is recognized as belonging to the security level 3. Namely, at least three gates (i.e., the gates 1, 3, and 4) have to be passed through to intrude from the building gate into the area A.

The area classification module 1004 transforms all the skeleton points having their radiuses as local maximums in the skeleton 400 through the method illustrated in FIG. 5 and figures out the security levels corresponding to all the areas. In the present example, the area B is classified as the security level 2, the area C is classified as the security level 2, and the area D is classified as the security level 1.

Figure 6B:
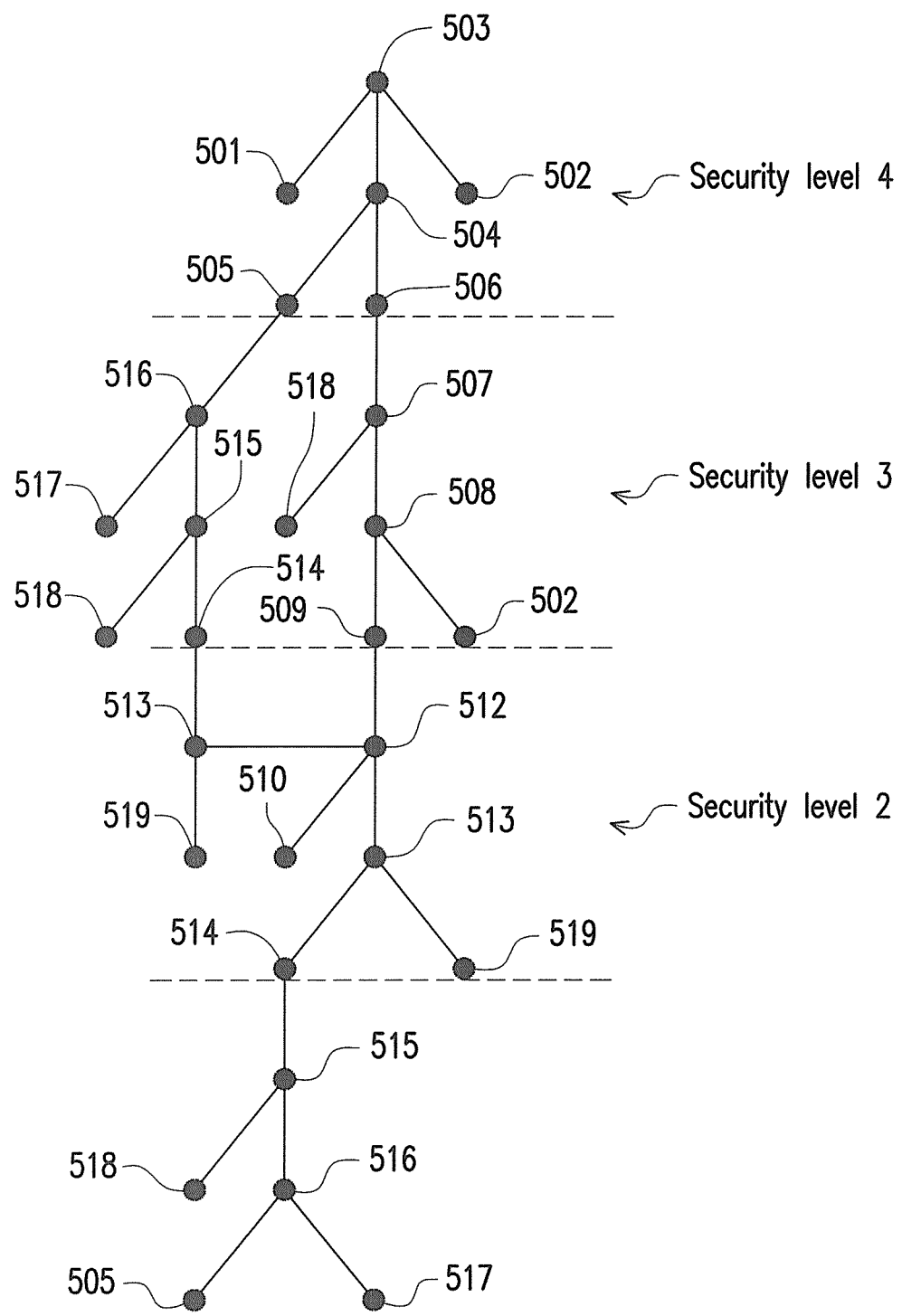
FIG. 6B and FIG. 6C are diagrams illustrating an example of tree structure classification based on the skeleton illustrated in FIG. 6A.
Figure 6C:
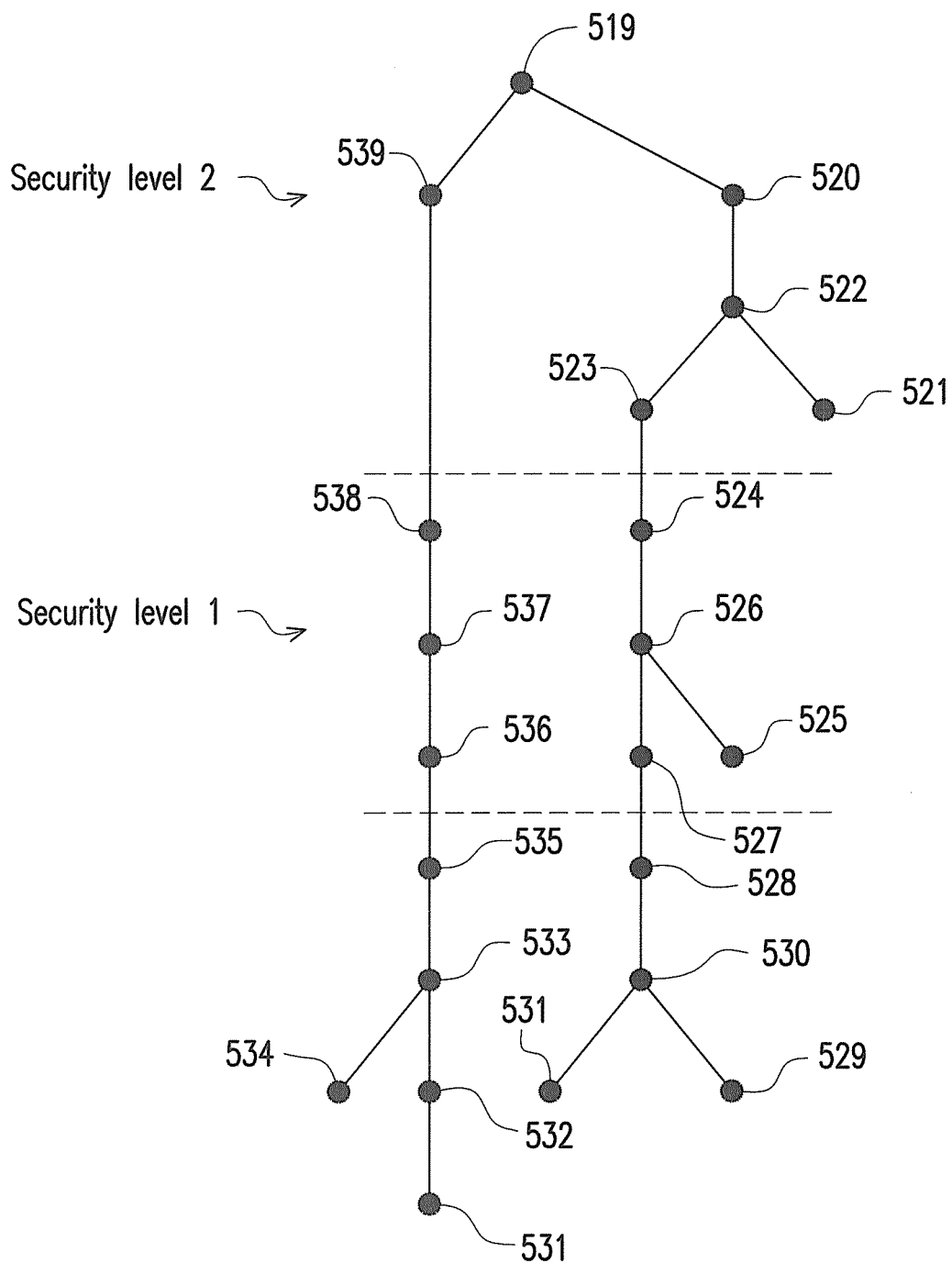

FIG. 6A is a diagram illustrating a ground plane and a skeleton thereof, according to another exemplary embodiment of the present disclosure, and FIG. 6B and FIG. 6C are diagrams illustrating an example of tree structure classification based on the skeleton illustrated in FIG. 6A.

Referring to FIG. 6A, the skeleton corresponding to the ground plane is composed of the skeleton points 501-539. The position of the skeleton point 537 is the building gate, and the position of the skeleton point 519 is a gate for further entering an internal area.

FIG. 6B and FIG. 6C illustrate a tree structure with the skeleton point 503 as the root. Based on analysis performed on this tree structure, four gates (i.e., through the positions of the skeleton points 537, 519, 509, and 506 or the positions of the skeleton points 537, 519, 514, and 505) are to be passed through while moving from the building gate (i.e., the position of the skeleton point 537) to the area corresponding to the skeleton point 503. Thus, the security level of the area corresponding to the skeleton point 503 is classified as the security level 4.

It should be noted that a multi-story building will have multiple ground planes. The area recognition module 1002 is able to recognize the gates and areas of each ground plane according to the method described above. The gates of the ground plane may be for stairs, elevators, rooms, or building entrances. The skeleton points of the corresponding stair gates and elevators for the upper (lower) floor and its next lower (upper) floor become the essential passages between them or to the ground. In such case, when the area classification module 1004 generates the tree structure of an upper floor with the skeleton point within the local area as the root, it is able to take the gate stairs or elevators as the common skeleton points between the upper floor and its lower floor, and append the tree structure of the lower floor to the tree structure of the upper floor. The default security levels of these common stairs and elevators are the same in both floors. Nevertheless, the security levels of them may be different based on user requirements. In case the lower floor is not a ground floor, the area classification module 1004 is capable of continuously performing the above-mentioned action on the next lower floor until it reaches the ground floor. In the same way, when the area classification module 1004 generates the tree structure of a underground floor with the skeleton point within the local area as the root, it is able to take the gate stairs or elevators as the common skeleton points between the underground floor and its upper floor, and append the tree structure of the upper floor to the tree structure of the underground floor. In case the upper floor is not a ground floor, the area classification module 1004 is capable of continuously performing the above-mentioned action on the next upper floor until it reaches the ground floor.

While figuring out the security levels, a tree structure may also be created with the building gate as the root, and the least number of gate points to be passed through while moving from the root to each skeleton point is calculated according to the tree structure and used as the security level of the skeleton point. If there are multiple building gates, the level of each skeleton point corresponding to each of the building gates has to be calculated through the method described above with each of the building gates as the root, and the smallest level is served as the level of the skeleton point. The security level of each area is the level of the skeleton point having the greatest radius within this area.

A tree structure of a multi-story building may also be created with the building gates of the ground floor as the root. The area classification module 1004 is able to take the corresponding stairs and elevators as the essential passages between the ground floor and its next upper floor. It is capable of generating the tree structure of the ground floor and then building up the next upper floor through these common skeleton points of gate stairs and elevators. The default security levels of these common gate stairs and elevators are the same in both floors. Nevertheless, the security levels of them may be different based on user requirements. In case the upper floor is not the top floor, the area classification module 1004 is capable of continuously performing the above-mentioned action on the next upper floor until it reaches the top floor. In the same way, the area classification module 1004 is capable of generating the tree structure of the next underground floor through the common skeleton points of gate stairs and elevators as soon as the tree structure of the ground floor has completed. In case the underground floor is not the lowest floor, the area classification module 1004 is capable of continuously performing the above-mentioned action on the next underground floor until it reaches the lowest floor.

In another exemplary embodiment of the present disclosure, the area classification module 1004 may also figure out the security level corresponding to each area according to the number of external walls corresponding to the area. To be specific, all the boundaries in the ground plane are categorized into external walls and internal walls, wherein the external walls refer to walls between the building and the exterior space, and the internal walls refer to partition walls between areas in the building. An area is prone to being intruded if the area is formed by mostly external walls. Referring to FIG. 1 and FIG. 4B, in the present exemplary embodiment, the area recognition module 1002 determines whether the boundaries 21-33 are enclosed by the skeleton 400 according to the skeleton points 401-418 of the skeleton 400, wherein the boundaries enclosed by the skeleton 400 are recognized as internal walls, and the boundaries not enclosed by the skeleton 400 are recognized as external walls. For example, when the area recognition module 1002 is about to determine whether the boundary 26 is an external wall or an internal wall, the area recognition module 1002 recognizes the skeleton point 402 on the boundary 26 and searches for the next skeleton point (for example, the skeleton points 410, 411, 409, 405, and 404) along a connecting rod that is in the anticlockwise direction and forms a smallest angle with the boundary 26. The skeleton point 402 on the boundary 26 is re-located again through this searching action. Thus, the area recognition module 1002 determines the boundary 26 to be an internal wall. In another case, when the area recognition module 1002 is about to determine whether the boundary 23 is an external wall or an internal wall, the area recognition module 1002 recognizes the skeleton point 402 on the boundary 23 and searches for the next skeleton point (for example, the skeleton points 404 and 401) along a connecting rod that is in the anticlockwise direction and forms a smallest angle with the boundary 23. The skeleton point 402 on the boundary 23 is not re-located through this searching action. Thus, the area recognition module 1002 determines the boundary 23 to be an external wall. Accordingly, the area classification module 1004 determines that the boundaries for forming the area A include two external walls (i.e., the boundaries 21 and 23), the boundaries for forming the area B include one external wall (i.e., the boundary 27), the boundaries for forming the area C include two external walls (i.e., the boundaries 22 and 25), and the boundaries for forming the area D include three external walls (i.e., the boundaries 30, 31, and 32) according to the recognition result of the area recognition module 1002. Thereby, by simply considering the number of external walls corresponding to each area, the area A is classified as the security level 2, the area B is classified as the security level 3, the area C is classified as the security level 2, and the area D is classified as the security level 1.

In another exemplary embodiment of the present disclosure, the area classification module 1004 may base on whether the gates are equipped with access control to determine the security level of each area according to the number of gates between the area and the building gate, or the external walls corresponding to the area. The area classification module 1004 may also determine the security level of each area by taking a weighted average of the number of gates between the area and the building gate, and the number of external walls corresponding to the area.

Referring to FIG. 3 again, in an exemplary embodiment of the present disclosure, the multi-level intrusion event detecting system 1000 further includes a rule setting module 1006. The rule setting module 1006 is employed to establish the correlations between security event detection rules and the security levels, and adjust the statuses of certain specific areas and gates to "no detect" or to "detect". For example, the rule setting module 1006 is capable of selecting the areas corresponding to the security level 1 or the areas corresponding to the security levels 1 and 2 as detection areas during different time periods according to a security event detection rule established on the security levels by a user.

In an exemplary embodiment of the present disclosure, the multi-level intrusion event detecting system 1000 further includes a display module 1008. The display module 1008 stitches the field of views (FOV) of images of the detection area generated by the sensor devices 202, 204, and 206 to the ground plane 100. As described above, the sensor devices 202, 204, and 206 generate FOVs of the images of the detection ranges 212, 214, and 216. Besides, the multi-level intrusion event detecting system 1000 receives the FOVs of the images generated by the sensor devices 202, 204, and 206, and the display module 1008 respectively stitches the FOVs of the images generated by the sensor devices 202, 204, and 206 to the ground plane 100 by using homography matrices corresponding to the sensor devices 202, 204, and 206.

To be specific, when the sensor devices 202, 204, and 206 are calibrated, the coordinates of the images generated by the sensor devices 202, 204, and 206 and the coordinates of the ground plane are used for generating coordinate transformation matrices (i.e., the homography matrices). After that, the FOVs of the images generated by the sensor devices 202, 204, and 206 are stitched to the ground plane 100 by using the homography matrices of the sensor devices 202, 204, and 206. However, the present disclosure is not limited to stitching the FOVs of the images generated by the sensor devices to the ground plane by using the homography matrices of the sensor devices, and other sensor device calibration techniques may also be applied to the present disclosure.

In the present exemplary embodiment, the display module 1008 displays the FOVs of the images generated by the sensor devices 202, 204, and 206 corresponding to the ground plane 100, and automatically generates tripwires in the ground plane 100 according to the boundaries and the gates corresponding to the detection area recognized by the rule setting module 1006. For example, when the rule setting module 1006 recognizes the area D as a detection area according to user's requirement, the display module 1008 illustrates the tripwires in the ground plane 100 according to the boundaries 29, 30, 31, 32, and 33 and the gates 1, 2, and 3 for forming the area D.

In an exemplary embodiment of the present disclosure, the multi-level intrusion event detecting system 1000 further includes a detection module 1010. The detection module 1010 detects whether any object passes over the tripwires illustrated by the display module 1008 or appears within the detection area in the ground plane displayed by the display module 1008. For example, if the area D is recognized as a detection area and tripwires have been illustrated in the ground plane displayed by the display module 1008 according to the boundaries 29, 30, 31, 32, and 33 and the gates 1, 2, and 3 for forming the area D, the detection module 1010 issues an alarm message to notify the user when an object image passes over the tripwires or the object image appears within the detection area D in the ground plane displayed by the display module 1008.

In an exemplary embodiment of the present disclosure, the multi-level intrusion event detecting system 1000 further includes an interface module 1012. The interface module 1012 adjusts the positions, sizes, and security levels of the areas and tripwires generated by the display module 1008 in the ground plane. For example, the user can increase the security level of an area or delete or change the tripwires generated by the display module 1008 through the interface module 1012, so as to adjust the detection range or position of the detection module 1010.

In addition, the user may also add other tripwires in the ground plane displayed by the display module 1008 through the interface module 1012, so as to expand the detection range of the detection module 1010. Namely, other tripwires may also be added by the user into the ground plane displayed by the display module 1008 through the interface module 1012 besides the tripwires automatically generated by the display module 1008.

Moreover, in another exemplary embodiment of the present disclosure, the user may also simultaneously select areas corresponding to the same security levels through the interface module 1012, and the display module 1008 may generate tripwires in the ground plane according to the boundaries and the gates corresponding to the selected area. The user may also simultaneously select some boundaries (for example, all the external walls) among the boundaries 21-33 or some gates (for example, the building gate) among the gates 1-4 through the interface module 1012, and the display module 1008 may generate the tripwires in the ground plane corresponding to the selected boundaries or gates according to the user's selection.

In an exemplary embodiment of the present disclosure, the multi-level intrusion event detecting system 1000 further includes a detection efficiency analysis module 1014. The detection efficiency analysis module 1014 calculates a detectable range of each area according to the FOVs of the images generated by the sensor devices 202, 204, and 206 and calculates the detection coverage rate of each area according to the detectable range and the range of the area.

Taking the area D as an example, the detection efficiency analysis module 1014 calculates the range of the area D (i.e., the measure of the area D), calculates the detectable range of the area D in the FOV of the image generated by the sensor device 206 through following formula (1), and calculates the detection coverage rate of the area D through following formula (2).

$$\text{Area}(R, C) = \{X_i \mid X_i \in \text{map}(R), X_i \in FOV(C)\} \quad (1)$$

$$\text{CoverRate}(R, C) = \frac{\text{Area}(R, C)}{\text{map}(R)} \quad (2)$$

In foregoing formula (1) and formula (2), $X_i$ represents a point in the ground plane, R represents an area, map(R) represents the range of the area R, C represents a sensor device, FOV(C) represents the range of the FOV of the image generated by the sensor device, Area(R,C) represents the detectable range of the area R under the sensor device C (i.e., the intersection of the range of the area R and the range of the FOV of the image generated by the sensor device C), and CoverRate (R,C) represents the detection coverage rate of the area R under the sensor device C.

In particular, if more than one sensor device generate FOVs of the image corresponding to the same area, the detection coverage rate is calculated according to the union of the detectable ranges of all the sensor devices in the area, as indicated by following formula (3).

$$\text{CoverRate}(R, C_1, C_2) = \frac{\text{Area}(R, C_1) \cup \text{Area}(R, C_2)}{\text{map}(R)} \quad (3)$$

In foregoing formula (3), C1 and C2 respectively represent different sensor devices.

In addition, the detection efficiency analysis module 1014 further calculates a effective detection value of the detectable range of each area and calculates the effective detection rate of each area according to the detection coverage rate of the area and the effective detection value of the detectable range of the area.

Taking the area D as an example, the detection efficiency analysis module 1014 calculates the effective detection value of each point within the detectable range of the area D through following formula (4) and calculates the effective detection rate of the area D through following formula (5).

$$\text{Detection}(X_i) = \max(1/(1 + (X_i - X_c)^2)) \quad (4)$$

$$\text{EffectRate}(R, C) = \frac{\sum_{X_i \in \text{Area}(R,C)} \text{Detection}(X_i)}{\text{CoverRate}(R, C)} \quad (5)$$

In foregoing formula (4) and formula (5), $X_c$ represents the position of the sensor device C, Detection ($X_i$) represents the effective detection value of $X_i$, and EffectRate(R,C) represents the effective detection rate of the area R under the sensor device C. In particular, if more than one sensor device can detect a same point, the effective detection value of the point is calculated as the maximum value.

In an exemplary embodiment of the present disclosure, the multi-level intrusion event detecting system 1000 further includes a detection efficiency analysis module 1014. The detection efficiency analysis module 1014 calculates the detectable range of each tripwire according to the FOVs of images generated by the sensor devices 202, 204, and 206 and calculates the detection coverage rate of each tripwire according to the detectable range and the range of the tripwire.

Taking the tripwire 801 on the gate 1 as illustrated in FIG. 7 as an example, the detection efficiency analysis module 1014 calculates the range of the tripwire 801, calculates the range of the gate 1 in the FOV of the image generated by the sensor device 206 through following formula (6) as the detectable range of the tripwire 801, and calculates the detection coverage rate of the tripwire 801 through following formula (7).

$$\text{Line}(L, C) = \{X_i \mid X_i \in \text{tripwire}(L), X_i \in FOV(C)\} \quad (6)$$

$$\text{CoverRate}(L, C) = \frac{\text{Line}(L, C)}{\text{tripwire}(L)} \quad (7)$$

In foregoing formula (6) and formula (7), $X_i$ represents a point in the ground plane, L represents a tripwire, tripwire(L) represents the range of the tripwire L, C represents a sensor device, FOV(C) represents the range of the FOV of the image generated by the sensor device, Line(L,C) represents the detectable range (i.e., the intersection of the range of the tripwire L and the range of the FOV of the image generated by the sensor device C) of the tripwire L under the sensor device C, and CoverRate(L,C) represents the detection coverage rate of the tripwire L under the sensor device C.

In particular, if more than one sensor device generate FOVs of the image corresponding to the same tripwire, the detection coverage rate is calculated according to the union of the detectable ranges of all the sensor devices in the area, as indicated by following formula (8).

$$CoverRate(L, C_1, C_2) = \frac{Line(L, C_1) \cup Line(L, C_2)}{tripwire(L)} \quad (8)$$

In foregoing formula (8), C1 and C2 respectively represent different sensor devices.

Similarly, the detection efficiency analysis module 1014 further calculates the effective detection value of the detectable range of each tripwire, and calculates the effective detection rate of each tripwire according to the detection coverage rate of the tripwire and the effective detection value of the detectable range of the tripwire.

Taking the tripwire 801 as an example, the detection efficiency analysis module 1014 calculates the effective detection value of each point within the detectable range of the tripwire 801 through the formula (4) and calculates the effective detection rate of the tripwire 801 through following formula (9).

$$EffectRate(L, C) = \frac{\sum_{X_i \in Line(L,C)} Detection(X_i)}{CoverRate(L, C)} \quad (9)$$

In foregoing formula (9), EffectRate(L,C) represents the effective detection rate of the tripwire L under the sensor device C. Particularly, when more than one sensor device can detect the same point, the effective detection value of the point is calculated as the maximum value.

Figure 7A:
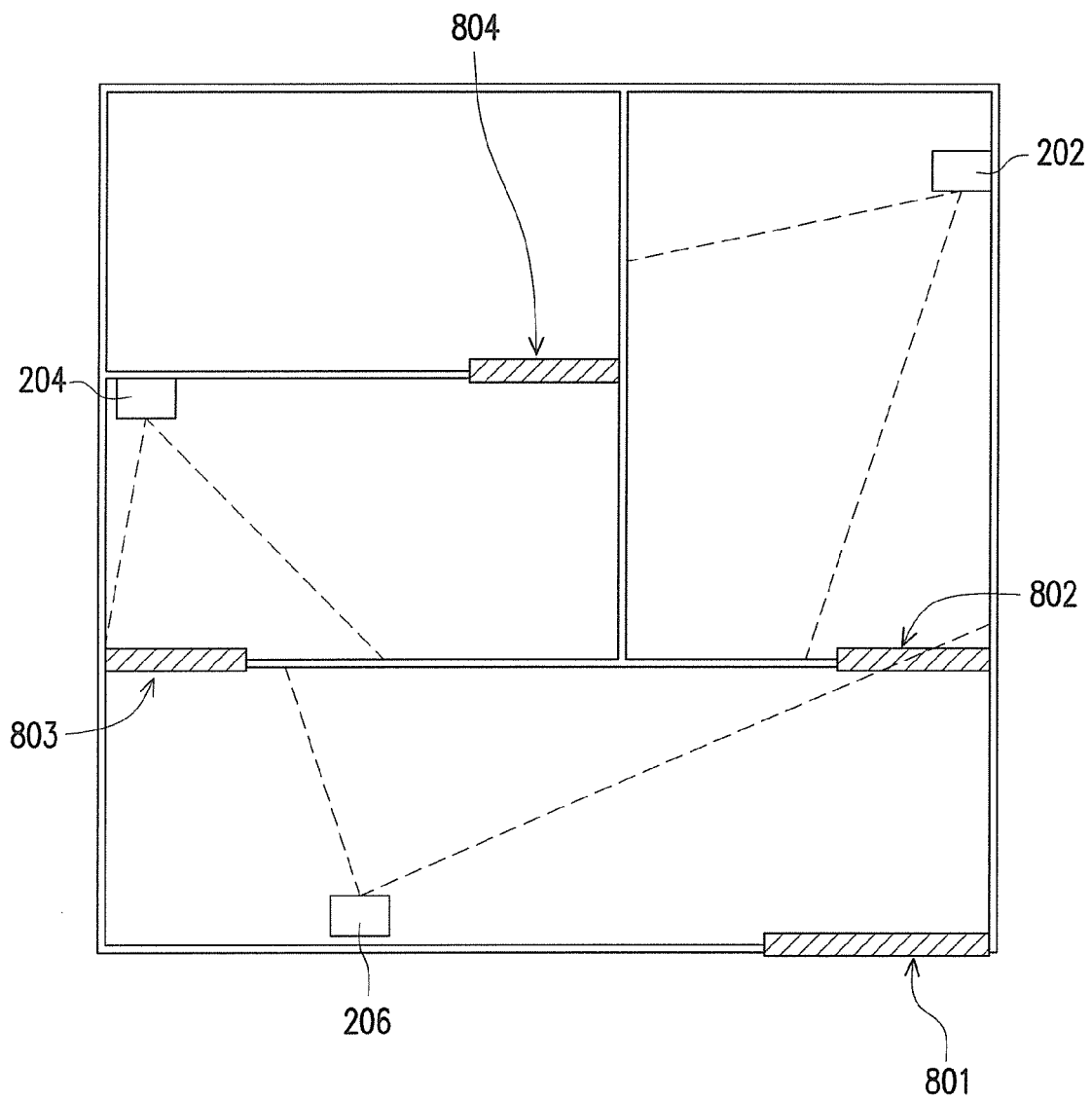

FIG. 7A and FIG. 7B diagrams illustrating an example of detection coverage rates and effective detection rates of areas and gates according to an exemplary embodiment of the present disclosure.

Referring to FIG. 7A, the sensor devices 202, 204, and 206 respectively detect a part of the ground plane 100. Through calculations of the detection efficiency analysis module 1014, the display module 1008 displays the detection coverage rates and effective detection rates of the areas A, B, C, and D calculated by the detection efficiency analysis module 1014 and the tripwires 801, 802, 803, and 804 on the gates 1, 2, 3, and 4 (as shown in FIG. 7B). Particularly, the user may evaluate the current deployment of the sensor devices 202, 204, and 206 according to the detection coverage rates and the effective detection rates of the areas A, B, C, and D and the tripwires 801, 802, 803, and 804. For example, the user can evaluate the deployment of the sensor devices 202, 204, and 206 so as to maximize the detection coverage rate or the effective detection rate of the detection area. The user can also determine the number of sensor devices to be deployed in order to achieve the maximum detection coverage rate or effective detection rate of the detection area.

Figure 8:
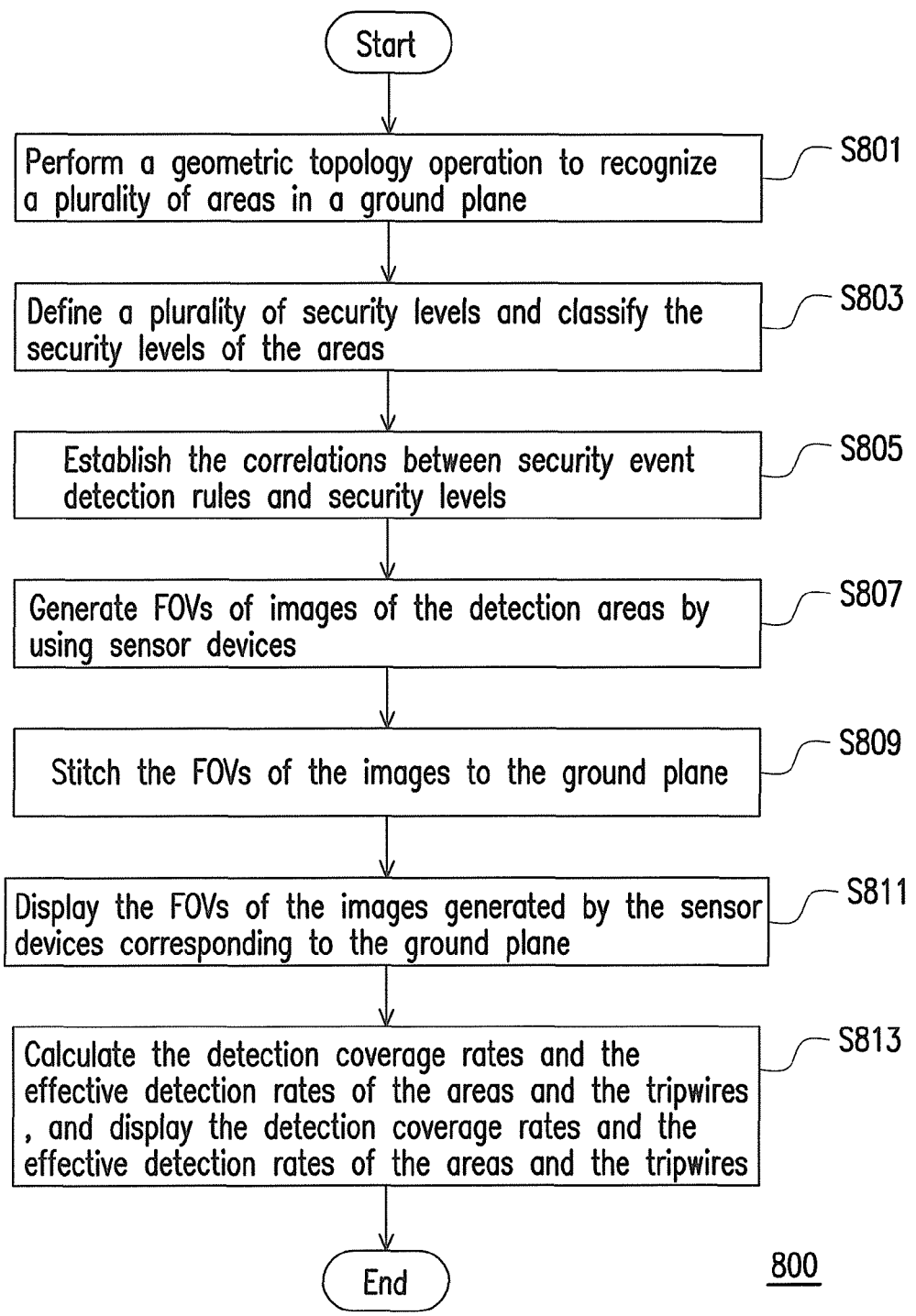
FIG. 8 is a flowchart of area partition and condition setting in a multi-level intrusion event detecting method according to an exemplary embodiment of the present disclosure.

FIG. 8 is a flowchart of area partition and condition setting in a multi-level intrusion event detecting method according to an exemplary embodiment of the present disclosure.

Referring to FIG. 8, in the multi-level intrusion event detecting process 800, the area recognition module 1002 first performs a geometric topology operation to recognize a plurality of areas in a ground plane (step S801). For example, the step S801 uses medial axis transformation to generate a skeleton of the corresponding ground plane, and wall corners, gate points, and areas are then recognized according to the radiuses of inscribed circles corresponding to the skeleton points in the skeleton. The medial axial transformation as well as the method of recognizing areas, wall points, and gates have been described above therefore will not be described herein.

Then, the area classification module 1004 defines a plurality of security levels and classifies the security levels of the areas (step S803). For example, the area classification module 1004 transforms the skeleton into a tree structure with a skeleton point in the recognized area as the root and calculates the least number of gate points to be passed through from the root to a building gate point according to the tree structure, so as to determine the security level of the area corresponding to the root. In another exemplary embodiment, the security level of each area may also be determined according to the number of gates between the area and the building gate with the building gate as the root. Additionally, in another exemplary embodiment, the area classification module 1004 may recognize external walls and internal walls in the ground plane according to the skeleton generated through the medial axis transformation and the skeleton points, and determine the security level of each area according to the number of external walls corresponding to the area. The methods of recognizing external and internal walls have been described above therefore will not be described herein. Furthermore, in another exemplary embodiment, the area classification module 1004 may also determine the security level of each area according to a weighted average of the number of gates between the area and the building gate and the number of external walls corresponding to the area.

Next, in step S805, the rule setting module 1006 establishes the correlations between security event detection rules and the security levels, and adjusts the statuses of certain specific areas and gates to "no detect" or to "detect".

In an exemplary embodiment of the present disclosure, the multi-level intrusion event detecting process 800 further includes generating a FOVs of images of the detection areas by using sensor devices (step S807), and stitching the FOVs of the images to the ground plane (step S809). The method of stitching the FOVs of the images to the ground plane has been described above therefore will not be described herein.

In an exemplary embodiment of the present disclosure, the multi-level intrusion event detecting process 800 further includes displaying the FOVs of the images generated by the sensor devices corresponding to the ground plane in the display module 1008 (step S811) and automatically generating tripwires in the ground plane stitched with the FOV of the image according to the boundaries and the gates corresponding to the detection area. Namely, the tripwires are automatically illustrated in the ground plane according to the boundaries and the gates corresponding to the detection area.

In an exemplary embodiment of the present disclosure, the multi-level intrusion event detecting process 800 further includes calculating the detection coverage rates and the effective detection rates of the areas and the tripwires, and displaying the detection coverage rates and the effective detection rates of the areas and the tripwires in the display module 1008 (step S813). The method for calculating the detection coverage rate and the effective detection rate of each area or tripwire has been described above therefore will not be described herein.

It should be understood that in another exemplary embodiment of the present disclosure, the multi-level intrusion event detecting process 800 may further include changing and deleting the automatically generated tripwires in the ground plane. Meanwhile, a user may also add new tripwires according to part of the areas, part of the boundaries, or part of the gates.

Figure 9:
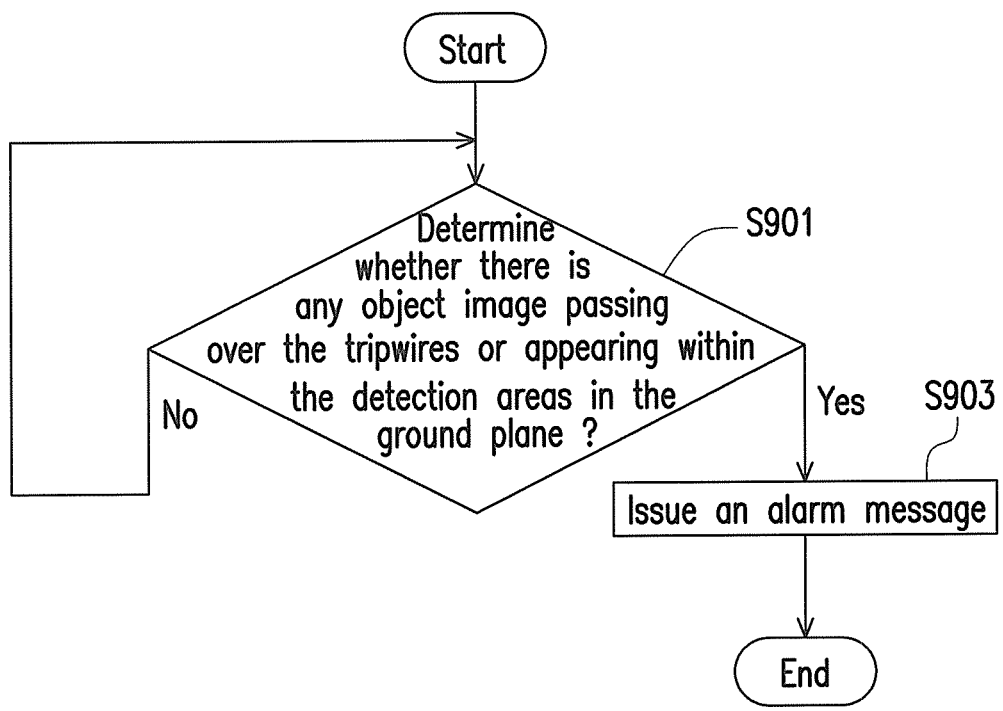
FIG. 9 is a flowchart of event detection processing in a multi-level intrusion event detecting method according to an exemplary embodiment of the present disclosure.

FIG. 9 is a flowchart of event detection processing in a multi-level intrusion event detecting method according to an exemplary embodiment of the present disclosure.

Referring to FIG. 9, the multi-level intrusion event detecting system 1000 starts to detect intrusion events after executing the multi-level intrusion event detecting process 800. In step S901, the detection module 1010 determines whether there is any object image passing over the tripwires or appearing within the detection area in the ground plane. If there is an object image that passes over the tripwires or appears within the detection area in the ground plane, in step S903, the detection module 1010 issues an alarm message. Otherwise, step S901 is executed to continue with the detection.

The present disclosure further provides a computer program product composed of a plurality of program instructions. The program instructions are suitable for being loaded into a computer system and executed by the same so as to perform the multi-level intrusion event detecting method described above and allow the computer system to have functions of the multi-level intrusion event detecting system described above.

In addition, the computer program product is stored in a computer-readable recording medium and subsequently read by a computer system, wherein the computer-readable recording medium may be any data storage medium. The computer-readable recording medium may be a read-only memory (ROM), a random-access memory (RAM), a CD-ROM, a magnetic tape, a floppy disc, an optical data storage device, or a carrier wave (for example, data transmission through the Internet).

As described above, in exemplary embodiments of the present disclosure, the system and the method for detecting multi-level intrusion events are provided, wherein areas in a building are automatically recognized and security levels of the areas are automatically determined. In addition, in exemplary embodiments of the present disclosure, a corresponding detection area is automatically recognized according to the security levels of the areas, the FOV of an image generated by a sensor device is stitched to the ground plane, and tripwires corresponding to the detection area are generated in the ground plane for detecting the intrusion event in the detection area. Moreover, in exemplary embodiments of the present disclosure, the tripwires can be adjusted according to user input so that the detection area and the tripwires can be set according to user's requirement.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A multi-level intrusion event detecting system, comprising:
    an area recognition module, configured for performing a geometric topology operation to recognize a plurality of areas in a ground plane, wherein the ground plane comprises a plurality of boundaries and a plurality of gates, and each of the areas is corresponding to at least one of the boundaries and at least one of the gates; and
    an area classification module, configured for defining a plurality of security levels and respectively classifying the areas recognized by the area recognition module as the security levels,
    wherein the geometric topology operation is a medial axis transformation,
    wherein the area recognition module generates a skeleton corresponding to the ground plane through the medial axis transformation,
    wherein the skeleton has a plurality of skeleton points, each of the skeleton points has a radius, and the radiuses are radiuses of maximum inscribed circles between the skeleton points and the boundaries in the ground plane,
    wherein the area recognition module recognizes the areas and the gates according to the skeleton points and the radiuses of the skeleton points.

2. The multi-level intrusion event detecting system according to claim 1,
    wherein the area recognition module searches for a plurality of local minimum radiuses among the radiuses, recognizes the skeleton points corresponding to the local minimum radiuses not equal to 0 as a plurality of gate points, recognizes tangent points between the maximum inscribed circles of the gate points and the boundaries, and recognizes connecting lines between the gate points and the corresponding tangent points as the gates,
    wherein the area recognition module searches for a plurality of local maximum radiuses among the radiuses, and recognizes positions of the skeleton points corresponding to the local maximum radiuses as the areas.

3. The multi-level intrusion event detecting system according to claim 2, wherein the area classification module transforms the skeleton into a tree structure with the skeleton point corresponding to each of the local maximum radiuses as a root, recognizes a building gate point among the gate points in each of the tree structures, and figures out the security level corresponding to each of the areas according to the number of the gate points between the root in the corresponding tree structure and the building gate point.

4. The multi-level intrusion event detecting system according to claim 2, wherein the area classification module recognizes a building gate point among the gate points in the skeleton, transforms the skeleton into a tree structure with the building gate point as a root, and figures out the security level corresponding to each of the areas according to the number of the gate points between the skeleton points corresponding to the local maximum radiuses in the tree structure and the building gate point.

5. The multi-level intrusion event detecting system according to claim 2, wherein the area recognition module categorizes the boundaries into a plurality of external walls and a plurality of internal walls according to the skeleton points of the skeleton,
    wherein the area classification module figures out the security level corresponding to each of the areas according to the number of the external walls corresponding to the area.

6. The multi-level intrusion event detecting system according to claim 2, wherein the area classification module transforms the skeleton into a tree structure with the skeleton point corresponding to each of the local maximum radiuses as a root, and recognizes a building gate point among the gate points in each of the tree structures, wherein the area recognition module categorizes the boundaries into a plurality of external walls and a plurality of internal walls according to the skeleton points of the skeleton, wherein the area classification module figures out the security level corresponding to each of the areas according to a weighted average of the number of the gate points between the root in the corresponding tree structure and the building gate point, and the numbers of the external walls corresponding to the areas.

7. The multi-level intrusion event detecting system according to claim 2, wherein the area classification module recognizes a building gate point among the gate points in the skeleton and transforms the skeleton into a tree structure with the building gate point as a root, wherein the area recognition module categorizes the boundaries into a plurality of external walls and a plurality of internal walls according to the skeleton points of the skeleton, wherein the area classification module figures out the security level corresponding to each of the areas according to a weighted average of the number of the gate points between the skeleton points corresponding to the local maximum radiuses and the building gate point in the tree structure, and the numbers of the external walls corresponding to the areas.

8. The multi-level intrusion event detecting system according to claim 5, wherein the area classification module determines whether each of the boundaries is enclosed by the skeleton, and recognizes the boundaries enclosed by the skeleton as the internal walls and the boundaries not enclosed by the skeleton as the external walls.

9. The multi-level intrusion event detecting system according to claim 1 further comprising:

a rule setting module, configured for establishing the correlations between a plurality of security event detection rules and the security levels, and adjusting the statuses of certain specific areas and gates to "no detect" or to "detect"; and a display module, configured for stitching a field of view (FOV) of at least one image from at least one sensor device to the ground plane, displaying the FOV of the at least one image generated by the at least one sensor device corresponding to the ground plane, and generating tripwires according to the boundaries and the gates corresponding to the detection area in the ground plane stitched with the FOV of the at least one image.

10. The multi-level intrusion event detecting system according to claim 9 further comprising:

an interface module, configured for adjusting the tripwires generated by the display module in the ground plane displayed by the display module.

11. The multi-level intrusion event detecting system according to claim 10, wherein the interface module further adds new tripwires into the ground plane displayed by the display module.

12. The multi-level intrusion event detecting system according to claim 9 further comprising:

a detection module, configured for issuing an alarm message when an object image passes over the tripwires or the object image appears within the detection area in the ground plane.

13. The multi-level intrusion event detecting system according to claim 9, wherein the sensor device is selected from a group consisting of a video camera, an infrared detector, a thermal imaging device, and a radar scanner.

14. The multi-level intrusion event detecting system according to claim 9 further comprising:

a detection efficiency analysis module, configured for calculating a detectable range of each of the areas according to the FOV of the at least one image from the at least one sensor device, and for calculating a detection coverage rate of each of the areas according to the detectable range of the area and ranges of the areas, wherein the display module displays the detection coverage rates of the areas calculated by the detection efficiency analysis module.

15. The multi-level intrusion event detecting system according to claim 14, wherein the detection efficiency analysis module calculates a effective detection value of the detectable range of each of the areas and calculates an effective detection rate of each of the areas according to the detection coverage rate of the area and the effective detection value of the detectable range of the area, wherein the display module displays the effective detection rates of the areas calculated by the detection efficiency analysis module.

16. The multi-level intrusion event detecting system according to claim 11, wherein the interface module is further employed to simultaneously select the areas corresponding to the same security levels, and the display module generates the tripwires according to the boundaries and the gates corresponding to the selected area in the ground plane.

17. The multi-level intrusion event detecting system according to claim 11, wherein the interface module is further employed to simultaneously select a portion of the boundaries or a portion of the gates, and the display module generates the tripwires according to the selected boundaries or the selected gates in the ground plane.

18. The multi-level intrusion event detecting system according to claim 11, wherein the display module stitches the FOV of the at least one image to the ground plane by using a homography matrix.

19. A multi-level intrusion event detecting method, comprising:

performing a geometric topology operation to recognize a plurality of areas in a ground plane, wherein the ground plane comprises a plurality of boundaries and a plurality of gates, and each of the areas is corresponding to at least one of the boundaries and at least one of the gates;

defining a plurality of security levels; and classifying the areas respectively as the security levels, wherein the geometric topology operation is a medial axis transformation, wherein the step of performing the geometric topology operation to recognize the areas in the ground plane comprises:

generating a skeleton corresponding to the ground plane through the medial axis transformation, wherein the skeleton has a plurality of skeleton points, each of the skeleton points has a radius, and the radiuses are radiuses of maximum inscribed circles between the skeleton points and the boundaries in the ground plane; and recognizing the areas and the gates according to the skeleton points and the radiuses of the skeleton points.

20. The multi-level intrusion event detecting method according to claim 19, wherein the step of recognizing the areas and the gates according to the skeleton points and the radiuses of the skeleton points comprises:

searching for a plurality of local minimum radiuses among the radiuses;

recognizing the skeleton points corresponding to the local minimum radiuses not equal to 0 as a plurality of gate points;

recognizing tangent points between the maximum inscribed circles of the gate points and the boundaries;

recognizing connecting lines between the gate points and the corresponding tangent points as the gates;

searching for a plurality of local maximum radiuses among the radiuses; and recognizing positions of the skeleton points corresponding to the local maximum radiuses as the areas.

21. The multi-level intrusion event detecting method according to claim 20, wherein the step of respectively classifying the areas as the security levels comprises:

transforming the skeleton into a tree structure with the skeleton point corresponding to each of the local maximum radiuses as a root;

recognizing a building gate point among the gate points in each of the tree structures; and figuring out the security level corresponding to each of the areas according to the number of the gate points between the root in the corresponding tree structure and the building gate point.

22. The multi-level intrusion event detecting method according to claim 20, wherein the step of respectively classifying the areas as the security levels comprises:

recognizing a building gate point among the gate points in the skeleton;

transforming the skeleton into a tree structure with the building gate point as a root; and figuring out the security level corresponding to each of the areas according to the number of the gate points between the skeleton points corresponding to the local maximum radiuses in the tree structure and the building gate point.

23. The multi-level intrusion event detecting method according to claim 20, wherein the step of respectively classifying the areas as the security levels further comprises:

categorizing the boundaries into a plurality of external walls and a plurality of internal walls according to the skeleton points of the skeleton; and figuring out the security level corresponding to each of the areas according to the number of the external walls corresponding to the area.

24. The multi-level intrusion event detecting method according to claim 20, wherein the step of respectively classifying the areas as the security levels further comprises:

transforming the skeleton into a tree structure with the skeleton point corresponding to each of the local maximum radiuses as a root;

recognizing a building gate point among the gate points in each of the tree structures;

categorizes the boundaries into a plurality of external walls and a plurality of internal walls according to the skeleton points of the skeleton; and figuring out the security level corresponding to each of the areas according to a weighted average of the number of the gate points between the root in the corresponding tree structure and the building gate point, and the numbers of the external walls corresponding to the areas.

25. The multi-level intrusion event detecting method according to claim 20, wherein the step of respectively classifying the areas as the security levels comprises:

recognizing a building gate point among the gate points in the skeleton;

transforming the skeleton into a tree structure with the building gate point as a root;

categorizing the boundaries into a plurality of external walls and a plurality of internal walls according to the skeleton points of the skeleton; and figuring out the security level corresponding to each of the areas according to a weighted average of the number of the gate points between the skeleton points corresponding to the local maximum radiuses and the building gate point in the tree structure, and the numbers of the external walls corresponding to the areas.

26. The multi-level intrusion event detecting method according to claim 23, wherein the step of categorizing the boundaries into the external walls and the internal walls according to the skeleton points of the skeleton comprises:

determining whether each of the boundaries is enclosed by the skeleton; and recognizing the boundaries enclosed by the skeleton as the internal walls; and recognizing the boundaries not enclosed by the skeleton as the external walls.

27. The multi-level intrusion event detecting method according to claim 19 further comprising:

establishing the correlations between security event detection rules and security levels, and adjusting the statuses of certain specific areas and gates to "no detect" or to "detect";

generating a FOV of at least one image corresponding to the detection area by using at least one sensor device;

stitching the FOV of the at least one image to the ground plane;

displaying the FOV of the image generated by the at least one sensor device corresponding to the ground plane in a display module; and generating tripwires according to the boundaries and the gates corresponding to the detection area in the ground plane.

28. The multi-level intrusion event detecting method according to claim 27 further comprising:

adjusting the tripwires generated according to the boundaries and the gates corresponding to the detection area in the ground plane displayed by the display module by using an interface module; and adding new tripwires in the ground plane.

29. The multi-level intrusion event detecting method according to claim 27 further comprising:

issuing an alarm message when an object image passes over the tripwires or the object image appears within the detection area in the ground plane.

30. The multi-level intrusion event detecting method according to claim 27 further comprising:

calculating a detectable range of each of the areas according to the FOV of the at least one image from the sensor device;

calculating a detection coverage rate of each of the areas according to the detectable range of the area and ranges of the areas; and displaying the detection coverage rates of the areas.

31. The multi-level intrusion event detecting method according to claim 30 further comprising:

calculating a effective detection value of the detectable range of each of the areas;

calculating an effective detection rate of each of the areas according to the detection coverage rate of the area and the effective detection value of the detectable range of the area; and displaying the effective detection rates of the areas.

32. The multi-level intrusion event detecting method according to claim 28 further comprising:

simultaneously selecting the areas corresponding to the same security levels in the interface module; and generating the tripwires according to the boundaries and the gates corresponding to the selected area in the ground plane.

33. The multi-level intrusion event detecting method according to claim 28 further comprising:

simultaneously selecting a portion of the boundaries or a portion of the gates in the interface module; and generating the tripwires according to the selected boundaries or the selected gates in the ground plane.

34. The multi-level intrusion event detecting method according to claim 27, wherein the step of stitching the FOV of the at least one image to the ground plane comprises:

stitching the FOV of the at least one image to the ground plane by using a homography matrix.

35. A computer program product, comprising a plurality of program instructions, which when executed by a computer system, cause the computer system to execute the multi-level intrusion event detecting method according to claim 19.

36. A computer-readable recording medium having a program, which when executed by a computer system, cause the computer system to execute the multi-level intrusion event detecting method according to claim 19.

* * * * *